United States Patent
Lee et al.

(10) Patent No.: US 7,541,691 B2
(45) Date of Patent: Jun. 2, 2009

(54) STANDBY POWER SUPPLY APPARATUS

(75) Inventors: Jin-hyung Lee, Anyang-si (KR); Se-ra Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 11/652,069

(22) Filed: Jan. 11, 2007

(65) Prior Publication Data

US 2008/0036299 A1 Feb. 14, 2008

(30) Foreign Application Priority Data

Aug. 8, 2006 (KR) .............. 10-2006-0074486

(51) Int. Cl.
*H02J 1/10* (2006.01)
(52) U.S. Cl. ................................................ 307/43
(58) Field of Classification Search .............. 307/43
See application file for complete search history.

(56) References Cited

FOREIGN PATENT DOCUMENTS

| JP | 2005-143249 | A | 6/2005 |
|----|-------------|---|--------|
| KR | 200243495 | Y1 | 10/2001 |
| KR | 100342415 | B1 | 7/2002 |

*Primary Examiner*—Robert L. Deberadinis
(74) *Attorney, Agent, or Firm*—Sughrue Mion, PLLC

(57) ABSTRACT

A standby power supply apparatus is provided in which a supply voltage of the standby power source, supplied before electronic apparatuses such as TVs or video players are switched on, is reduced by half to sharply reduce the consumption of the standby electric power. According to the standby power supply apparatus, it is possible to reduce by half the electric power loss due to switching the standby power converter controlling the standby electric power of the power supply apparatus on and off. Additionally, the standby electric power can be sharply reduced without an additional increase in manufacturing costs of the power supply apparatus.

10 Claims, 2 Drawing Sheets

STANDBY POWER SUPPLY APPARATUS

CROSS-REFERENCE TO RELATED APPLICATIONS

This application claims priority from Korean Patent Application No. 10-2006-0074486, filed on Aug. 8, 2006, in the Korean Intellectual Property Office, the disclosure of which is incorporated herein by reference in its entirety.

BACKGROUND OF THE INVENTION

1. Field of the Invention

Apparatuses consistent with the present invention relate to a standby power supply apparatus, and more particularly, to a standby power supply apparatus in which a supply voltage of the standby power source, supplied before electronic apparatuses, such as televisions (TVs) or video players, are switched on, is reduced by half to sharply reduce the consumption of standby electric power.

2. Description of the Related Art

Generally, when a power source is not supplied to electronic apparatuses such as TVs, air conditioners or video players, which are controlled by a remote controller, the apparatuses remain in standby mode until the power source is supplied.

When electronic apparatuses are switched off, the electronic apparatuses remain in standby mode until the next time they are switched on. In standby mode, electronic apparatuses turn off the main power source to stop supplying the power source to most internal circuits and to supply electric power outputted from a standby power source to circuits which receive "power on" signals from a remote controller and other kinds of circuits.

FIG. 1 is a schematic diagram illustrating the internal structure of a related art power supply apparatus.

The related art power supply apparatus includes an alternating current (AC) rectifier circuit 110, a main power converter 120, a standby transformer 130, a standby power output unit 140 and a standby power converter 150.

In the related art power supply apparatus, an AC power source received from outside the apparatus and is rectified by the AC rectifier circuit 110. The rectified AC power source is supplied as a main power source to the apparatus by the main power converter 120.

At this time, the rectified AC power source is applied to the standby transformer 130, and the standby transformer 130 converts the power source inputted from the AC rectifier circuit 110 to a low voltage.

The power source of the low voltage is rectified into a direct current voltage by a first diode D1, and is smoothed by a second capacitor C2 to be supplied as a standby power source by the standby power output unit 140.

However, when the related art power supply apparatus operated above is in standby mode for a longer time, than in operation mode, excessive electric power is wasted when in standby mode.

Therefore, a method is required to efficiently reduce the electric power consumed when electronic apparatuses are in standby mode.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. The present invention provides a standby power supply apparatus in which a supply voltage of the standby power source, supplied before electronic apparatuses such as TVs or video players are switched on, is reduced by half to sharply reduce the consumption of the standby electric power.

In order to achieve the above-described aspects of the present invention, a standby power supply apparatus is provided, which includes an AC rectifier circuit which rectifies an inputted AC power source; a detector which detects the divided voltage of the rectified AC power source; and a standby transformer which converts the divided voltage to a low voltage.

The standby transformer is connected to a point at which the rectified AC power source is divided, and the detector applies the divided voltage of the AC power source to the standby transformer.

The divided voltage may be a half, a third or a quarter of the AC power source.

The apparatus further comprises a standby power output unit, connected to an output end of the standby transformer, for outputting a standby power source. The standby transformer is connected to the standby power output unit through a diode connected in series between the standby transformer and the standby power output unit, and a capacitor connected in parallel between the standby transformer and the standby power output unit.

Two capacitors are connected in parallel between an output line of the AC rectifier circuit and the ground, and the detector is connected to the standby transformer through a diode.

A standby power converter is connected between the standby transformer and the ground to switch on the standby transformer to use the applied AC power source as a standby power source.

BRIEF DESCRIPTION OF THE DRAWINGS

The above and other aspects of the present invention will be more apparent by describing certain exemplary embodiments of the present invention with reference to the accompanying drawings, in which.

Throughout the drawings, the same drawing reference numerals will be understood to refer to the same elements, features and structures.

DETAILED DESCRIPTION OF EXEMPLARY EMBODIMENTS OF THE INVENTION

Figure 1:
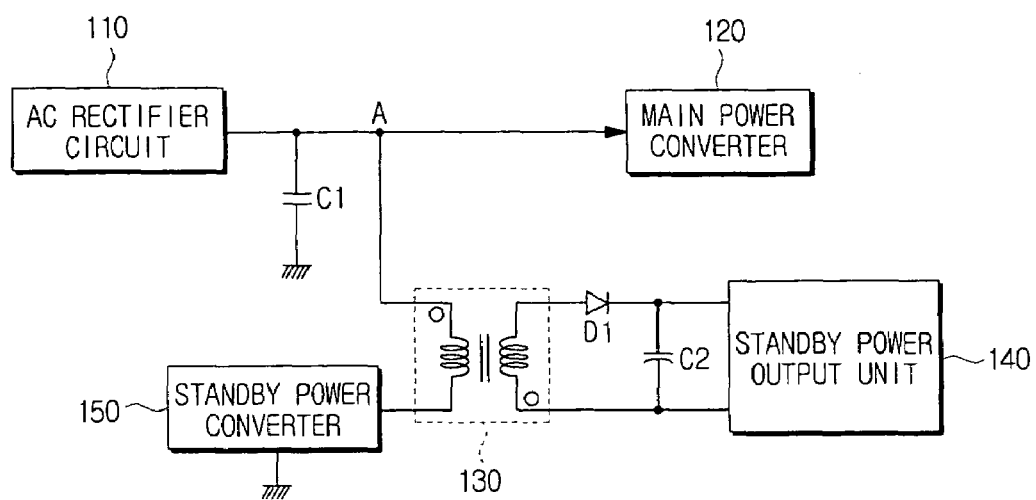
FIG. 1 is a schematic diagram illustrating the internal structure of a related art power supply apparatus.

Exemplary embodiments of the present invention will now be described in detail with reference to the annexed drawings. In the drawings, the same elements are denoted by the same reference numerals throughout the drawings. In the following description, detailed descriptions of known functions and configurations incorporated herein have been omitted for conciseness and clarity.

Figure 2:
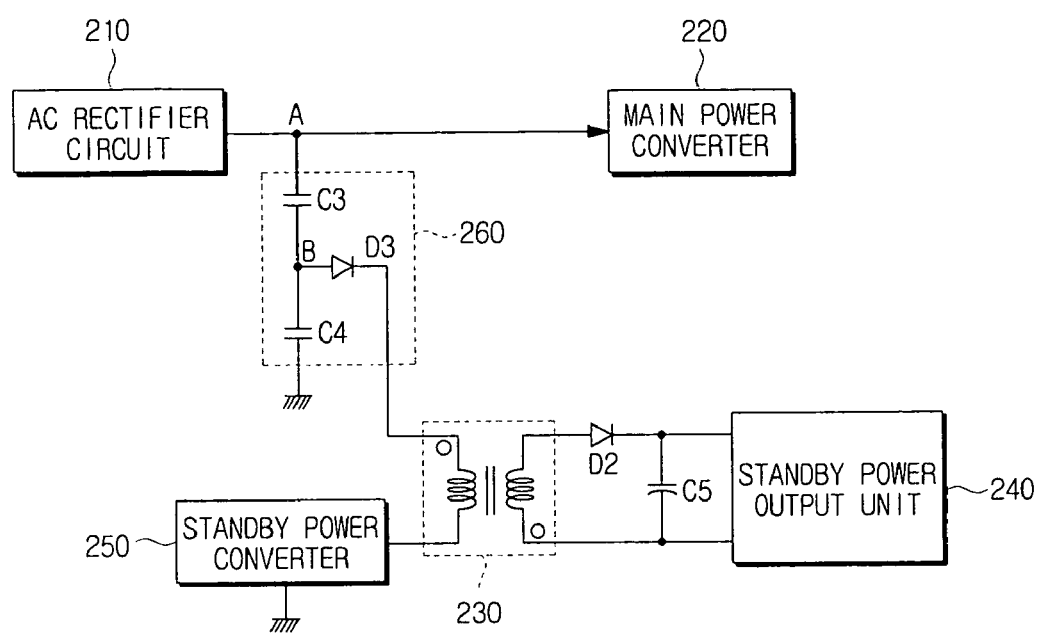
FIG. 2 is a schematic diagram illustrating the structure of a standby power supply apparatus according to an exemplary embodiment of the present invention.

FIG. 2 is a schematic diagram illustrating the structure of a standby power supply apparatus according to an exemplary embodiment of the present invention.

In the standby power supply apparatus according to an exemplary embodiment of the present invention, a third capacitor C3 is connected in parallel to a fourth capacitor C4 between an output line of an AC rectifier circuit 210 for rectifying an inputted AC power source and a ground. Additionally, a third diode D3 of detector 260 which detects half the voltage of the rectified AC power source outputted from the AC rectifier circuit 210 is connected to a junction point B between the third capacitor C3 and the fourth capacitor C4.

Additionally, a standby transformer 230 which converts a divided voltage of the AC power source detected by the detector 260 to a low voltage is connected to the detector 260. A standby power output unit 240 which outputs the standby power source is connected to an output end of the standby transformer 230. A standby power converter 250 is connected between the standby transformer 230 and the ground. At this time, the divided voltage may be a half, a third or so on of the AC voltage according to the size of the inputted AC power source.

In this case, the standby power converter 250 switches on the standby transformer 230 to use the applied AC power source as a standby power source. In other words, as the standby power converter 250 operates, the AC power source flows into the standby power converter 250 passing through a primary winding of the standby transformer 230.

The standby transformer 230 is connected to the junction point B through the third diode D3 where a rectified AC voltage Vac is reduced by half the voltage thereof, so that the detector 260 applies half the voltage of the rectified AC voltage Vac to the standby transformer 230.

The standby transformer 230 is connected to the standby power output unit 240 through a second diode D2 which is connected in series between the standby transformer and the standby power output unit, and a fifth capacitor C5 which is connected in parallel between the standby transformer and the standby power output unit.

The operation of the standby power supply apparatus constructed above is described below.

The AC power source Vin inputted to the standby power supply apparatus is rectified by the AC rectifier circuit 210.

The AC power source outputted from the AC rectifier circuit 210 has the voltage Vac at point A. In this case, the voltage Vac is 1.414 times higher than the input voltage Vin.

However, the detector 260 is connected in parallel to the output line of the AC rectifier circuit 210, so that the rectified AC power source is also applied to the detector 260.

Accordingly, half the voltage of the voltage Vac outputted onto the output line of the AC rectifier circuit 210 is applied to a main power converter 220, and the remainder of the voltage Vac is applied to the detector 260.

The detector 260 transmits half the applied voltage to the standby transformer 230 through a third diode D3.

The standby transformer 230 receiving half the voltage of the voltage Vac transmits a current generated by half the voltage to the standby power converter 250 through the primary winding. Accordingly, a voltage lower than half the voltage is generated from an electromotive force induced in a secondary winding.

The power source of the low voltage generated by the standby transformer 230 is rectified into a direct current voltage by the second diode D2, and smoothed by the fifth capacitor C5 to be supplied as a standby power source to the apparatus through the standby power output unit 240.

Therefore, the standby power supply apparatus according to the exemplary embodiment of the present invention operates using half the voltage of the AC voltage inputted in standby mode, so that it is possible to reduce the consumption of the standby electric power.

As described above, the exemplary embodiments of the present invention may implement a standby power supply apparatus in which a supply voltage of the standby power source, supplied before electronic apparatuses such as TVs or video players are switched on, is reduced by half to sharply reduce the consumption of the standby electric power.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

As described above, according to the exemplary embodiments of the present inventions, it is possible to reduce by half the electric power loss due to switching the standby power converter controlling the standby electric power of the power supply apparatus on and off. Additionally, the standby electric power can be sharply reduced without an additional increase in manufacturing costs of the power supply apparatus.

What is claimed is:

1. A standby power supply apparatus comprising:
an alternating current (AC) rectifier circuit which rectifies an input AC power source;
a detector which detects a divided voltage of the rectified AC power source; and
a standby transformer which converts the divided voltage to a lower voltage.

2. The apparatus as claimed in claim 1, wherein the standby transformer is connected to a point at which a rectified AC power source is divided, and the detector applies the divided voltage of the AC power source to the standby transformer.

3. The apparatus as claimed in claim 2, wherein the detector comprises a first capacitor and a second capacitor connected in parallel between an output line of the AC rectifier circuit and a ground.

4. The apparatus as claimed in claim 3, wherein the detector is connected to the standby transformer through a diode, and one end of the diode is connected to a junction point between the first and second capacitors of the detector.

5. The apparatus as claimed in claim 4, wherein the detector transmits the divided voltage of the rectified AC power source to the standby transformer through the diode.

6. The apparatus as claimed in claim 1, wherein the divided voltage is one half, a third and a quarter of the AC power source.

7. The apparatus as claimed in claim 1, further comprising a standby power output unit which is connected to an output end of the standby transformer, and outputs a standby power source.

8. The apparatus as claimed in claim 7, further comprising a diode connected in series between the standby transformer and the standby power output unit, and a capacitor connected in parallel between the standby transformer and the standby power output unit.

9. The apparatus as claimed in claim 1, wherein a standby power converter is connected between the standby transformer and the ground to switch on the standby transformer to use the divided voltage of the rectified AC power source as a standby power source.

10. The apparatus as claimed in claim 2, wherein the divided voltage is one of a half, a third and a quarter of the AC power source.

* * * * *